US007462494B2

(12) United States Patent
Lakshmi et al.

(10) Patent No.: US 7,462,494 B2
(45) Date of Patent: Dec. 9, 2008

(54) METHOD FOR LASER DESORPTION MASS SPECTROMETRY USING POROUS POLYMERIC SUBSTRATES WITH PARTICLE FILLERS

(75) Inventors: Brinda B. Lakshmi, Woodbury, MN (US); Bathsheba E. Chong Conklin, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 480 days.

(21) Appl. No.: 10/457,651

(22) Filed: Jun. 9, 2003

(65) Prior Publication Data

US 2004/0248108 A1 Dec. 9, 2004

(51) Int. Cl.
*G01N 24/00* (2006.01)

(52) U.S. Cl. ..................................................... 436/173

(58) Field of Classification Search .................. 436/173
See application file for complete search history.

(56) References Cited

U.S. PATENT DOCUMENTS

| | | | | |
|---|---|---|---|---|
| 3,383,247 | A | 5/1968 | Adlhart et al. | |
| 4,539,256 | A | 9/1985 | Shipman | |
| 5,130,342 | A | 7/1992 | McAllister et al. | |
| 5,385,694 | A | 1/1995 | Wu et al. | |
| 5,696,198 | A | 12/1997 | Chereisky et al. | |
| 5,945,175 | A | 8/1999 | Yahiaoui et al. | |
| 6,010,776 | A | 1/2000 | Exsted et al. | |
| 6,096,213 | A | 8/2000 | Radovanovic et al. | |
| 6,265,068 | B1 | 7/2001 | David et al. | |
| 6,288,390 | B1 | 9/2001 | Siuzdak et al. | |
| 2002/0171037 | A1 | 11/2002 | Ellson et al. | |
| 2003/0218130 | A1 | 11/2003 | Boschetti et al. | |
| 2004/0094705 | A1 * | 5/2004 | Wood et al. | 250/288 |

FOREIGN PATENT DOCUMENTS

| | | |
|---|---|---|
| EP | 0542522 | 5/1993 |
| WO | WO 89/11608 | 11/1989 |
| WO | WO 92/02580 | 2/1992 |
| WO | WO 01/66820 | 9/2001 |
| WO | WO 03/025631 | 3/2003 |
| WO | WO 03/051498 | 6/2003 |
| WO | WO 03/075307 | 9/2003 |

OTHER PUBLICATIONS

Wei et al. "Desoprtion-ionization mass spectrometry on porous silicon", Nature, 1999, v. 399, pp. 243-246.*

Worrall et al. "Purification of contaminated peptides and proteins on synthetic membrane surfaces for MALDI", Anal Chem., 1998, v. 70, pp. 750-756.*

(Continued)

*Primary Examiner*—Yelena G Gakh
(74) *Attorney, Agent, or Firm*—Sean J. Edman

(57) ABSTRACT

Articles and methods for the high-energy desorption/ionization of various compositions are disclosed. Methods of the invention utilize porous substrates, optionally in combination with one or more surface coatings and fillers, to provide enhanced desorption of analytes. Such enhanced desorption is particularly useful in fields of analysis such as mass spectrometry. This enhanced desorption has various utilities. For example, use of the porous substrate may allow desorption to be performed without the use of chemical matrices.

6 Claims, 13 Drawing Sheets

OTHER PUBLICATIONS

Sun et al. "Preparation of high density polyetheylene hollow fiber membranes by thermally induced separation method", Koubunshironbunshu, 1998, v. 55, No. 7, pp. 378-384, Abstract; http://www.aist.go.jp/NIMC/publication/annual98/13/13_8.html.*

Blackledge et al. "Polyethylene membrane as a sample support for direct MALDI analysis of high mass proteins", Anal. Chem., 1995, v. 67, pp. 843-848.*

McComb et al. "Application of nonporous polyurethane (PU) membranes and porous PU thin films as sample supports for MALDI-MS of wheat proteins", Can. J. Chem., 2001, v. 79, pp. 437-447.*

Wei et al, "*Desorption-ionization mass spectrometry on porous silicon*", Letters to Nature, v. 399, p. 243-246, (1999).

* cited by examiner

METHOD FOR LASER DESORPTION MASS SPECTROMETRY USING POROUS POLYMERIC SUBSTRATES WITH PARTICLE FILLERS

FIELD OF THE INVENTION

The present invention is directed to a substrate for use in the retention and subsequent desorption of molecules. More specifically, the invention is directed to a substrate for use in receiving and releasing samples to be used in analytical processes, such as mass spectrometry.

BACKGROUND

Matrix-assisted laser desorption and ionization (MALDI) mass spectrometry has developed into an important tool for the analysis of numerous compositions, especially complex biological materials. MALDI uses a chemical matrix to suspend and retain one or more analytes prior to subjecting the matrix and analytes to laser desorption and ionization. Prior to the development of current organic matrices used in MALDI, it was difficult to ionize intact analyte molecules without molecular fragmentation.

Numerous matrices have been developed over the years to fulfill the poorly understood requirements for successful laser absorption and analyte ionization without fragmentation of the analyte. The use of these matrices has become important because they have permitted the analysis of macromolecules that would otherwise not be readily observable using laser desorption and ionization methods.

MALDI has been successfully used to identify peptides, proteins, synthetic polymers, oligonucleotides, carbohydrates, and other large molecules. Unfortunately, traditional MALDI has drawbacks for the analysis of many small molecules because signals from the chemical matrix interfere with signals from analyte molecules. Chemical matrices have many other undesirable consequences besides signal interference. For example, matrices can complicate sample preparation, and the additional processing steps and materials risk the introduction of contaminants into the sample. Both the matrix and analyte must typically be dissolvable in the same solvent, further complicating sample preparation. The matrix can also make it more difficult to interface separation techniques, and inhomogeneous sample spots can lead to a sweet-spot phenomenon wherein higher amounts of analyte and matrix crystals aggregate along the perimeter of the sample drop, leading to reduced reproducibility of spectra.

The co-crystallization process of sample and matrix is also often harsh, risking the denaturation or aggregation of proteins. Additionally, it is not always clear which matrix is appropriate for a given sample. For example, matrices that are effective for peptides and proteins often do not work for oligonucleotides or polymers. Furthermore, different matrices may be required in the positive-ion detection mode and the negative-ion detection mode. Thus, an exhaustive trial and error search can be required to find the optimal matrix.

Another difficulty with MALDI is that the currently used desorption substrates are typically metal plates. These metal plates are expensive and they typically must be cleaned after use so that they can be reused. Cleaning the metal plates is time consuming and presents the possibility of carryover contamination, and also does not allow for using the substrate as a storage device for archiving the analyte samples for additional analysis.

Therefore, a need exists for a method and apparatus for reducing or eliminating the need for matrices. In 1999, a matrix-free method was described by Wei et al. in U.S. Pat. No. 6,288,390. Wei discloses the use of silicon wafers that have been electrochemically etched with an HF/ethanol solution under illumination and constant current. The sample, in solvent, is applied directly to the silicon without the addition of any matrix. This method, labeled desorption/ionization on silicon (DIOS), allowed for the ionization of molecules within the mass range of 100 to 6000 Da without the interference caused by a matrix. Some spectra obtained using DIOS, however, have been difficult to reproduce, and the shelf life of the DIOS chips is often short. Also, DIOS chips are relatively expensive due to the high cost of the materials and processes used in their manufacture.

Therefore, a need remains for an apparatus and method that provides enhanced laser desorption in comparison to conventionally used techniques. There is also a need for an analyte desorption substrate that is sufficiently inexpensive so that it can be used and then discarded or archived.

SUMMARY OF THE INVENTION

The present invention is directed to articles and methods for the high-energy desorption/ionization of various compositions. A first implementation of the invention includes a porous polymeric article containing a polymeric substrate having a first surface;

a plurality of pores on the first surface of the polymeric substrate; and a coating over at least a portion of the plurality of pores; wherein the porous polymeric article is configured for receiving of analytes and subsequent desorption of the analytes.

Methods of the invention utilize porous substrates, optionally in combination with one or more surface coatings and fillers, to provide enhanced desorption of analytes. Such enhanced desorption is particularly useful in fields of analysis such as mass spectroscopy. This enhanced desorption has various utilities. For example, use of the porous substrate may allow desorption to be performed without the use of chemical matrices. In some matrixless implementations, particularly when a small molecule (such as those with a molecular weight of less than 1000) is being analyzed, the methods of the invention may achieve superior performance over that of conventional matrix based methods (for example, higher signal to noise ratios and/or better resolution).

Alternatively, the porous substrate may allow desorption to be performed in the presence of matrix, but with superior performance compared to standard matrix based methods using conventional desorption substrates. For example, using the porous substrate, an applied analyte/matrix droplet may dry in a more uniform manner than without a porous substrate. Also, in some implementations lower levels of matrix may be used, thereby reducing signal noise from the matrix. Such behavior is advantageous in allowing the use of automated sample deposition, location, and analysis. Also, use of the porous substrate may result in fewer ionic adducts (such as potassium and sodium) being formed, resulting in a simpler and easier to interpret spectrum.

Specific implementations of the invention are directed to an article having a porous surface. The article contains a polymeric substrate with a plurality of pores, and in certain implementations a nonvolatile coating over at least a portion of the plurality of pores. The present invention also provides for a desorption substrate that is made from relatively inexpensive raw materials and can be economically produced such that it may be used and disposed of, or alternatively used as a storage device for archiving analyte samples.

The methods and articles of the invention have many applications, including use in proteomics, which is the study of protein location, interaction, structure and function and seeks to identify and characterize the proteins present in both healthy and diseased biological samples. Other applications include DNA analysis, small molecule analysis, automated high throughput mass spectrometry, and combinations with separation techniques such as electrophoresis, immobilized affinity chromatography, or liquid chromatography.

Additional features and advantages of the invention will be apparent from the following detailed description of the invention and the claims. The above summary of principles of the disclosure is not intended to describe each illustrated embodiment or every implementation of the present disclosure. The detailed description that follows more particularly exemplifies certain embodiments utilizing the principles disclosed herein.

BRIEF DESCRIPTION OF THE DRAWINGS

The invention will be more fully explained with reference to the following drawings.

Figure 1A:
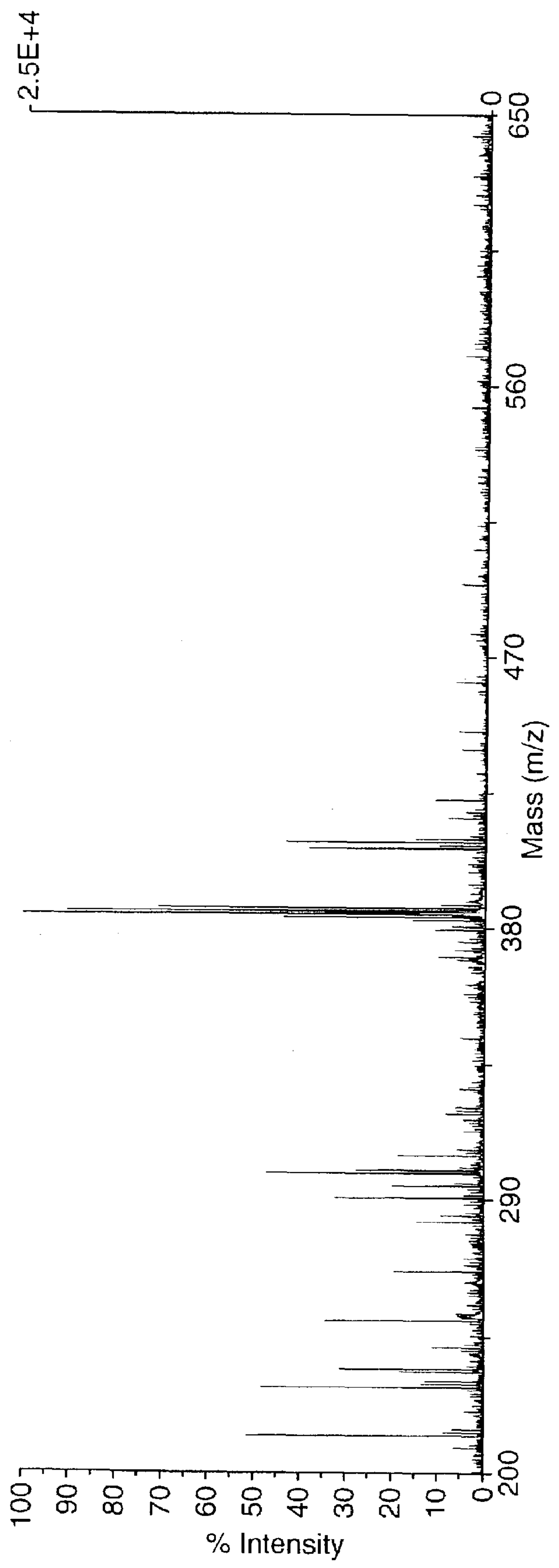
FIG. 1*a* is a mass spectrum of prazosin with matrix on conventional MALDI target.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure and claims.

DETAILED DESCRIPTION

A. General Configuration

The present invention is directed to methods and articles for the analysis of various compositions, in particular those utilizing high-energy desorption/ionization of a sample. For example, laser desorption and ionization of samples for mass spectroscopy are suitable applications of the invention. The apparatus serves to achieve, promote or enhance useful desorption and ionization without fragmentation. In addition to providing analyses without the complications of signal due to the matrix, in some implementations, such as when a small molecule is being analyzed, the methods of the invention may achieve superior performance (as manifested by, for example, higher signal to noise values) compared to traditional methods and devices.

Various aspects of the invention, including surface structure and topology, coating compositions, substrate materials and other aspects of the invention will now be described in greater detail.

B. Porous Article

Substrates made in accordance with the invention typically have a porous surface and include one or more surface coatings and/or particulate fillers. In certain embodiments of the invention the substrate comprises a high density polyethylene (HDPE) which has a carbon based filler, such as graphite or carbon black. The thermoplastic polymeric structure may be substantially homogeneous throughout there may be a porosity gradient in the structure, but is typically finely porous or porous. The particulate filler, whether graphite, carbon black, metal, or another material, may be substantially uniformly distributed throughout the article or the particulate filler may have a gradient density throughout the article.

The porous particulate-filled substrate may be provided as, for example, films, sheets, or webs. When the substrate is in the form of a film, the film may be uniaxially or biaxially oriented. The substrates of the invention often have a network of interconnected passageways to provide communicating pores, with high effective pore size range, low fluid flow resistance, broad pore size control and with up to 50 or more volume percent filler loading.

The substrate is typically formed by thermally induced phase separation, also known as TIPS, such as that taught in U.S. Pat. No. 4,539,256 entitled "Microporous sheet material, method of making and articles made therewith", incorporated herein by reference in its entirety. This thermodynamic, non-equilibrium phase separation may be either liquid-liquid phase separation or liquid-solid phase separation.

As used herein, the term "thermoplastic polymer" refers to conventional polymers, both crystalline and non-crystalline, which are melt processable under ordinary melt processing conditions.

As used herein, the term "crystalline", as used with regard to the thermoplastic polymer, includes polymers which are at least partially crystalline.

As used herein, the term "amorphous", as used with regard to the thermoplastic polymer, includes polymers without substantial crystalline ordering such as, for example, polymethylmethacrylate, polysulfone, and atactic polystyrene.

As used herein, the term "melting temperature" refers to the temperature at which the thermoplastic polymer, in a blend of thermoplastic polymer and compatible diluent, will melt.

As used herein, the term "crystallization temperature" refers to the temperature at which the thermoplastic polymer, in a melt blend of thermoplastic polymer and compatible diluent, will crystallize.

As used herein, the term "equilibrium melting point", as used with regard to the thermoplastic polymer, refers to the commonly accepted melting point temperature of the thermoplastic polymer as found in published literature.

As used herein, "particle" refers to submicron or low micron-sized particles, also termed "particulate filler" herein, such particles having a major axis no larger than five microns.

As used herein, "discretely dispersed" or "colloidal suspension" means that the particles are arrayed substantially as individual particles throughout a liquid or solid phase.

Thermoplastic polymers useful in the present invention include olefinic, condensation and oxidation polymers. One particularly suitable polymer is high density polyethylene (HDPE). Representative olefinic polymers include high and low density polyethylene, polypropylene, polyvinyl-containing polymers, butadiene-containing polymers, acrylate containing polymers such as polymethyl methacrylate, and fluorine containing polymers such as polyvinylidene fluoride. Condensation polymers include polyesters such as polyethylene terephthalate and polybutylene terephthalate, polyamides, polycarbonates and polysulfones. Polyphenylene oxide is representative of the oxidation polymers which can be used. Blends of thermoplastic polymers may also be used.

The compatible diluent is a material which is capable of forming a solution with the thermoplastic polymer when heated above the melt temperature of the polymer and which phase separates from the polymer on cooling. The compatibility of the liquid with the polymer can be determined by heating the polymer and the liquid to form a clear homogeneous solution. If a solution of the polymer and the liquid cannot be formed at any liquid concentration, then the liquid is generally inappropriate for use with that polymer. In practice, the liquid used may include compounds, which are solid at room temperature but liquid at the melt temperature of the polymer. Generally, for non-polar polymers, non-polar organic liquids with similar room temperature solubility parameters are generally useful at the solution temperatures. Similarly, polar organic liquids are generally useful with polar polymers. When blends of polymers are used, useful liquids are those that are compatible diluents for each of the polymers used. When the polymer is a block copolymer such as styrene-butadiene, the liquid selected must be compatible with each type of polymer block. Blends of two or more liquids can be used as the compatible diluent as long as the selected polymer is soluble in the liquid blend at the polymer melt temperature and the solution formed phase separates on cooling.

Various types of organic compounds have been found useful as the compatible diluent, including aliphatic and aromatic acids, aliphatic, aromatic and cyclic alcohols, aldehydes, primary and secondary amines, aromatic and ethoxylated amines, diamines, amides, esters and diesters, ethers, ketones and various hydrocarbons and heterocyclics. When the polymer selected is polypropylene, aliphatic hydrocarbons such as mineral oil, esters such as dibutyl phthalate and ethers such as dibenzyl ether are useful as the compatible diluent.

When high density polyethylene is the polymer, an aliphatic hydrocarbon such as mineral oil or and aliphatic ketone such as methyl nonyl ketone or an ester such as dioctyl phthalate are useful as the compatible diluent. Compatible diluents for use with low density polyethylene include aliphatic acids such as decanoic acid and oleic acid or primary alcohols such as decyl alcohol. When the polymer is polyvinylidene fluoride, esters such as dibutyl phthalate are useful as the compatible diluent. When the polymer selected is nylon 11, esters such as propylene carbonate, ethylene carbonate, or tetramethylene sulfone are useful as the compatible diluent. When the polymer selected is polymethylmethacrylate, useful compatible diluents include, 1,4-butanediol and lauric acid. A compatible diluent for use with the polymer polyphenylene oxide is, for example, tallowamine.

In certain embodiments, the particulate filler is arrayed in the structure. For example, when the structure is spherulitic, particles are in both the spherulites and in the fibrils between them. Although the particles are firmly held in the polymeric structure, they are substantially exposed after removal of the compatible diluent. In a structure, the distribution of particles is uniform wherever the polymer phase occurs. The particles substantially exist as individual, and not agglomerated, particles throughout the porous structure. Agglomerates of 3 to 4 particles may occur, but their frequency is typically no more than in the compatible diluent dispersion prior to melt blending with the polymer. The average particle spacing depends upon the volume loading of the particle in the polymer.

The compatible diluent is removed from the material to yield a particle-filled, substantially liquid-free, porous thermoplastic polymeric material. The compatible diluent may be removed by, for example, solvent extraction, volatilization, or any other convenient method, and the particle phase remains entrapped to a level of at least about 90 percent, more preferably 95 percent, most preferably 99 percent, in the porous polymer structure.

The particle-filled porous structures of this invention can be oriented, i.e., stretched beyond their elastic limit to introduce permanent set or elongation and to ensure that the micropores are permanently developed or formed. Orientation can be carried out either before or after removal of the compatible diluent. This orientation of the structures aids in controlling pore size and enhances the porosity and the mechanical properties of the material without changing the particle uniformity and degree of agglomeration in the polymer phase. Orientation causes the porous structure to expand such that the porosity increases.

Particle-filled porous films of the invention may be uniaxially or biaxially oriented in accordance with the teachings of Shipman in U.S. Pat. No. 4,539,256 incorporated by reference in its entirety. The particle-filled porous material of the invention may also be further modified, either before or after removal of the compatible diluent, by depositing various materials on the surface thereof using known coating or deposition techniques. For example, the particle-filled porous material may be coated with metal by vapor deposition or sputtering techniques or by materials such as adhesives, aqueous or solvent-based compositions, and dyes. Coating can be accomplished by such conventional coating techniques as, for example, roller coating, spray coating, dip coating, and the like.

C. Filler Material

The porous substrate of the invention normally include at least some filler particles, frequently a carbonaceous materials such as, for example, carbon black or graphite; and metals, such as gold, silver, and tungsten. The particles useful in the present invention are generally capable of forming a colloidal dispersion with the compatible diluent. The particle size is often less than 5 microns, more commonly less than 3 microns in size, and frequently less than about 1 micron in size. Useful particles besides carbonaceous materials include metals such as, for example, lead, platinum, tungsten, gold, bismuth, copper, and silver, metal oxides such as, for example, lead oxide, iron oxide, chrome oxide, titania, silica and alumina, and blends thereof. In general, materials that are good energy dispersers are beneficial, particular those that absorb light at the same wavelength as the energy used to laser desorb the analyte. For example, if the laser has a wavelength of 337 nm, it is typically desirable to have the particles at least partially absorb light at this wavelength.

The amount of filler particles in the thermoplastic polymer depends upon the amount of filler in the compatible diluent prior to melt blending and upon the relative amount of thermoplastic polymer and compatible diluent in the blend. The amount of particles colloidally dispersed in the compatible diluent depends upon how well the particles are wet by the diluent, the surface area of the particles, and the proper choice of a dispersing aid or surfactant. Generally, for non-porous particles, a dispersion containing 40-50 volume percent particles can be achieved. The amount of filler in the polymer can be much greater than the amount of filler in the compatible diluent when the melt blend has a higher concentration of liquid than polymer.

The actual polymer concentration selected from within the predetermined concentration range for the diluent-polymer system being used is limited by functional considerations. The polymer concentration and molecular weight should be sufficient to provide the porous structure which is formed on cooling with adequate strength for handling in further processing steps. The polymer concentration should be such that the viscosity of the diluent-polymer melt solution is suitable for the equipment used to shape the article.

Generally, the polymer concentration in the compatible diluent is about 10 to 80 weight percent, which corresponds to a compatible diluent concentration of 20 to 90 weight percent. When high compatible diluent concentrations, i.e. 80 to 90 percent, are used in conjunction with high volume percent of filler in the compatible diluent, a very high, e.g., about 95 weight percent, concentration of the particulate filler in the thermoplastic polymer, relative to the diluent, can be achieved. For example, if the blend is 90:10 diluent/polymer by volume and the liquid is 40 percent particulate filler by volume, then the resulting filled porous article is, surprisingly, 80 percent particulate filler by volume after the diluent is removed. That the particle-filled porous thermoplastic polymeric articles of the invention can contain such large amounts of particulate filler is unexpected because it is believed that particle-filled thermoplastic articles made by standard extrusion processes achieve only about 20 percent filler by volume.

D. Surface Treatment

The porous films of the present invention may be advantageously used in combination with one or more coatings applied on top of the porous film to provide enhanced desorption. Coatings may also serve other purposes; for example, coatings may provide a protective or abrasion-resistant barrier.

Useful coatings include organic materials such as graphite, carbon black, the families of materials referred to as Diamond-Like Carbon (DLC), as described in U.S. Pat. No. 6,265,068, and Diamond-Like Glass (DLG), as described in PCT publication WO 0166820 entitled Diamond-Like Glass Thin Films, and incorporated herein by reference, silanes and silane derivatives, and parylene. Other useful coatings according to the present invention include inorganic materials such as metals; for example aluminum, gold, silver, nickel, titanium, palladium, and platinum; metal oxides, for example titanium dioxide, silicon oxide and zirconium oxide, and alloys of metals or metal oxides, such as inconel or indium tin oxide.

Such surface coatings are generally nonvolatile under conditions used for laser desorption. That is, the coating either exhibits negligible volatility, or the entities that are volatilized are so low in molecular weight (for example, carbon clusters which may be emitted from graphite, or aluminum ions which may be emitted from aluminum) that they do not interfere with the analyte being measured. In this regard, the coatings are distinguished from conventional matrices. While matrix materials known in the art for MALDI applications are typically thought of as "nonvolatile" in that they have a slow evaporation or sublimation rate under ambient conditions, they are volatilized to a significant extent in the actual laser desorption process, and the volatilized species have molecular weight such that they may interfere with or obscure the analyte signal.

Coatings may be applied to the porous film via various methods, including vapor coating, sputter coating, plasma coating, vacuum sublimation, chemical vapor deposition, cathodic arc deposition, and so on. These methods are particularly suited for coating of metals and metal oxides. Coatings such as graphite are most easily applied by obtaining the graphite as a dispersion and applying it to the substrate by any of the well-known methods for liquid coating (knife coating, spray coating, dip coating, spin coating, etc.).

It can be advantageous to provide the coating in a discontinuous manner as opposed to a continuous coating over the entire porous surface. For example, the coating can be provided at discrete locations, such as spots. In the case of multilayer coatings, one coating may be discrete while the other may be continuous, according to the needs of the particular instance. Discontinuous coatings may serve several functions. For example, they may serve to demarcate the particular area in which the analyte sample is to be deposited, and then to allow the area to be located once the film with sample is placed in the mass spectrometer. A coating may also be used which provides a discontinuity in the surface energy of the porous film to advantageously contain a deposited analyte sample within a desired area, and to prevent wicking or spreading of the sample over an undesirably wide area.

Such coatings may be applied in a discrete manner via any number of methods. If the coating is applied via vapor coating, a mask, such as a perforated screen or film, may be used to limit the coating to the areas defined by the mask. In the case in which it is desired to have multilayer, registered discrete coatings (for example spots containing superimposed multilayer coatings), the mask can be attached to the film (for example via an adhesive) during coating of the different layers such that the layers are superimposed in registration. The mask is then removed after the final coating process. In an alternative embodiment, the perforated mask itself can remain on the film, in which case it will serve to provide wells that serve to contain the analyte droplet that is placed in the wells. It is also possible to provide a perforated layer for this purpose independently of any role in defining the coating. In the case of coatings such as graphite, well-known liquid coating methods such as gravure coating can be used to deposit the graphite in a discontinuous manner.

E. Device Assembly and Features

The present invention comprises a porous substrate, and optional coatings useful for enhanced desorption, particularly in mass spectroscopy. In typical use the film is attached to a standard metal plate for insertion into a mass spectrometry instrument. As such, a number of useful embodiments of the invention exist. It is advantageous to provide the porous substrate with a layer of adhesive applied to the back (non-porous) side, to facilitate attachment to the metal plate. The adhesive can be a laminating adhesive or double-faced tape. The laminating adhesive can be attached to the underside of the porous film, with a release liner remaining in place on the bottom of the adhesive. The user can then simply remove the release liner and attach the film directly to the plate by means of the adhesive. Alternatively, a separate piece of laminating adhesive can be supplied to the user, who can then apply the adhesive to the metal plate, remove the liner, and attach the porous film to the top of the adhesive.

The adhesive should be carefully selected such that it does not harbor or generate any impurities, which might contaminate the porous substrate. In addition, it may be desirable in some cases for the adhesive to be electrically conductive. Such conductive adhesives are readily available, for example conductive adhesive 9713 available from 3M of Maplewood, Minn. The adhesive may be selected such that it is permanently attached to the underside of the porous film; alternatively, it may be removable.

Typically, the porous film, optionally with attached adhesive underneath, will be packaged for delivery to the customer. This packaging may consist of any means that protects the film and does not act to impart contaminating impurities to the film. For example, the film could be packaged in a plastic bag or plastic case. As an additional protective measure, a protective liner may be placed atop the upper (porous) surface of the film.

F. Sample Preparation and Methods of Using the Substrates

The present invention is particularly well suited to mass spectrometry analysis. Analyte spots deposited on a substrate are hit with short laser pulses to desorb and ionize the sample. Ions are formed and then accelerated by one or more electric fields before arriving at a detector. The time it takes to reach the detector, or the location on the detector at which the particles strike, can be used to determine the mass of the particles. Time-of-flight analysis (TOF) is one mass spectrometry method that can be used. For molecules under 10,000 Da, a reflectron mode is used to condense the kinetic energy distribution of the ions reaching the detector. This method was developed to increase the resolution of mass spectroscopy and is used primarily for molecules under 10,000 Da. This higher resolution often results in a drop in sensitivity and a limited mass range.

G. Examples

Examples 1-4

A micro-porous high density polyethylene film (MPF) was produced using the thermally-induced phase separation technique described in U.S. Pat. No. 4,539,256. The film was produced using Finathene® 1285 high density polyethylene (AtoFina Petrochemicals Co. Houston, Tex.) with an initial mineral oil content of 74%. The mineral oil was extracted using a suitable solvent. The porosity of the resulting film was approximately 80% with an average pore size of approximately 0.26 microns.

To increase the hydrophilicity of the film, the following procedure was used. A 5 cm×5 cm piece of the film was clamped between two aluminum plates with the uppermost plate having 64 through-holes, 1 mm in diameter, spaced similar to a conventional MALDI metal plate. The clamped sample was then coated with a hydrophilic Diamond-Like Glass (DLG) coating using a Plasma-Therm vapor coater according to the methods described in PCT publication WO0166820 by exposing the sample to a DLG plasma on one side under the following conditions: 10 seconds of oxygen plasma, 30 seconds of oxygen and tetramethylene silane mixture, followed by 20 seconds of an oxygen plasma. The resulting film had 64 circular DLG spots.

Circles were then gently drawn on the membrane using a sharp tip razor blade to indicate where the analyte solutions would be deposited. A solution (10 ηg/μL in 1:1 $H_2O$:MeOH) of the drug molecule prazosin (419.9 Mw) was spotted (0.5 μL) onto the circular DLG regions on the film and air dried. A solution (0.1 μg/μL in 1:1 $H_2O$:MeOH) of the peptide neurotensin (1672.9 Mw) was spotted (0.5 μL) onto the circular DLG regions on the film and air dried. Prazosin belongs to a class of medicines called anti-hypertensives. It is used to treat high blood pressure (hypertension). Neurotensin, on the other hand, is an endogenous trideca-peptide neurotransmitter, which influences distinct central and peripheral physiological functions in mammals. Reflectron mode was used for all tests. To show that the porous substrates of the invention can be used with and without the use of a traditional matrix, Examples 1-4 were tested using the above drug and peptide analytes with the addition of 0.5 μL matrix solution ((α-cyano 4-hydroxycinnamic acid—CHCA, 1:1 acetonitrile:water, 0.1% TFA). As comparative examples, the same drug and peptide molecules were analyzed using a traditional steel MALDI plate with CHCA matrix.

Figure 1B:
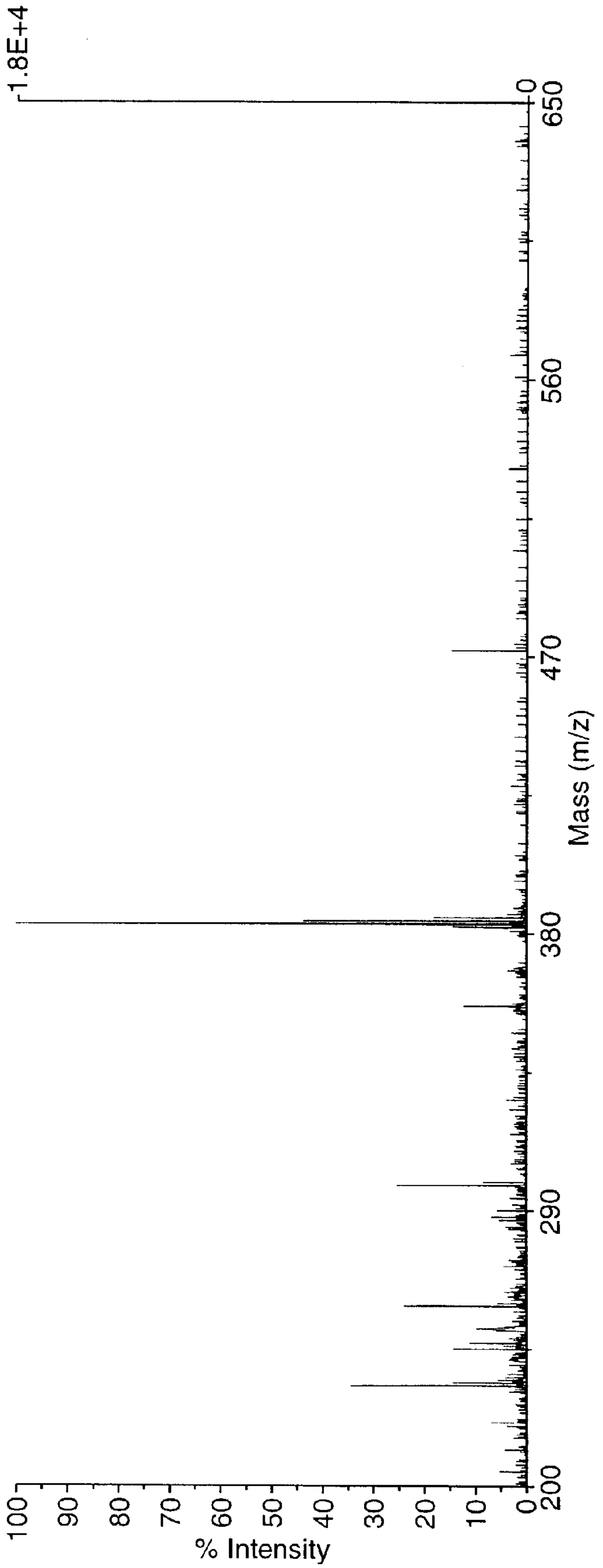
FIG. 1*b* is a mass spectrum of prazosin without matrix on graphite containing micro-porous high density polyethylene film plus a diamond like glass coating.

For each analysis, 2 spots/replicates were run and visually compared to each other for similarity in Resolution (R) and Signal to Noise (S/N) ratio. Resolution is the ability of a mass spectrometer to distinguish between ions of different mass-to-charge ratios. Greater resolution corresponds directly to the increased ability to differentiate ions of similar molecular weights. Resolution is usually defined as R=m/Dm in which Dm is the mass difference between two adjacent peaks that are just resolved and m is the mass of the first peak. In MALDI-TOF (time of flight) measurements, Dm is the width of the peak at half maxima (FWHM) of the peak corresponding to m. S/N is the ratio of the amplitude of the desired signal to the amplitude of noise signals at a given point in time. One factor that affects S/N is the concentration of the analyte. S/N usually increases with increasing analyte concentration. If the 2 spots did not compare well with each other, the analysis was rerun using a freshly prepared film. Table 1 below shows the use of DLG-coated porous films with and without matrix as LDI substrates compared to a traditional steel LDI plate. The LDI mass spectra of prazosin with matrix on a conventional MALDI target (C1) and prazosin without matrix on graphite loaded MPF with a DLG coating (E7) are shown in FIGS. 1*a* and 1*b*.

TABLE 1

| Molecule | Mol. Wt. | (Comparatives) Conventional MALDI plate with matrix | R | S/N | (Examples) MPF with matrix + DLG | R | S/N | (Examples) MPF without matrix + DLG | R | S/N |
|---|---|---|---|---|---|---|---|---|---|---|
| Prazosin | 419.9 | C1: | 4070 | 9330 | 1: | 3060 | 3900 | 3: | 4540 | 1340 |
| Neurotensin | 1672.9 | C2: | 10870 | 1800 | 2: | 3430 | 1700 | 4: | Not observed* | |

*No ion peak was detected for the analyte

Examples 5-8

Figure 2A:
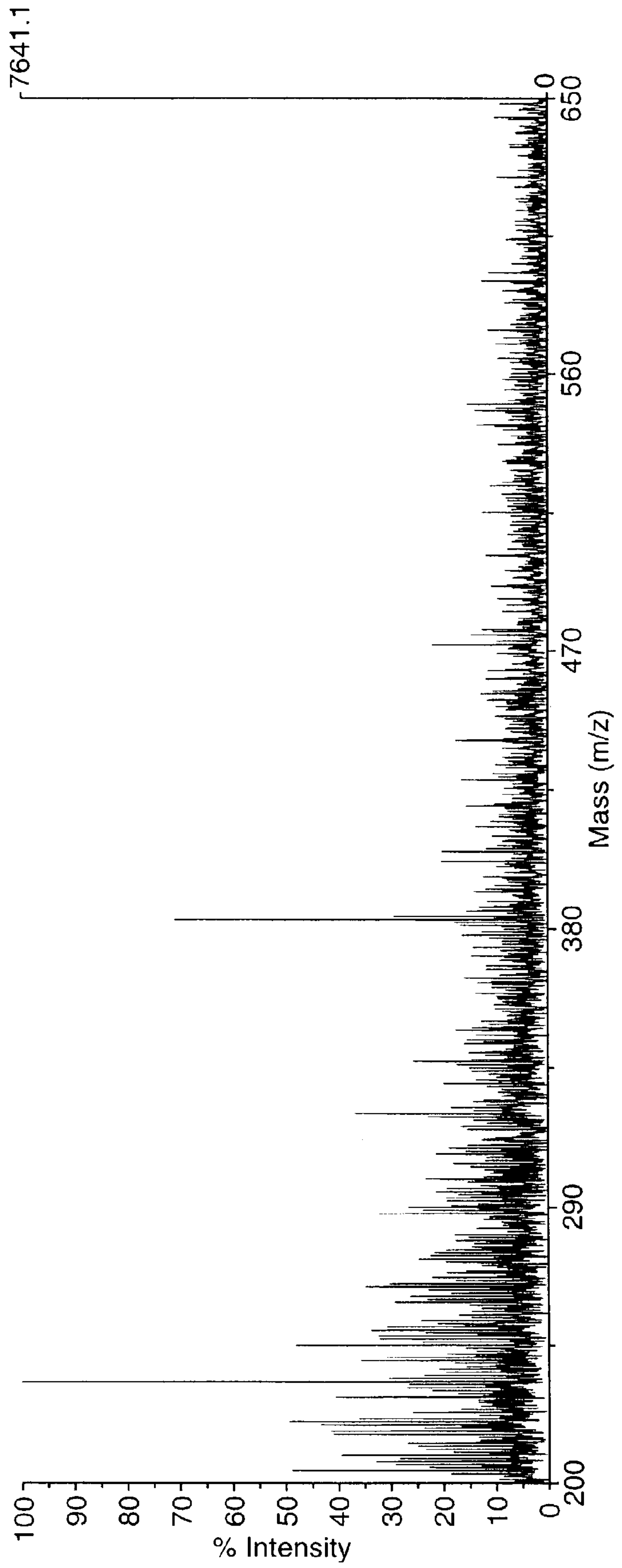
FIG. 2*a* is a mass spectrum of prazosin without matrix on graphite containing micro-porous high density polyethylene film without a diamond like glass coating.
Figure 2B:
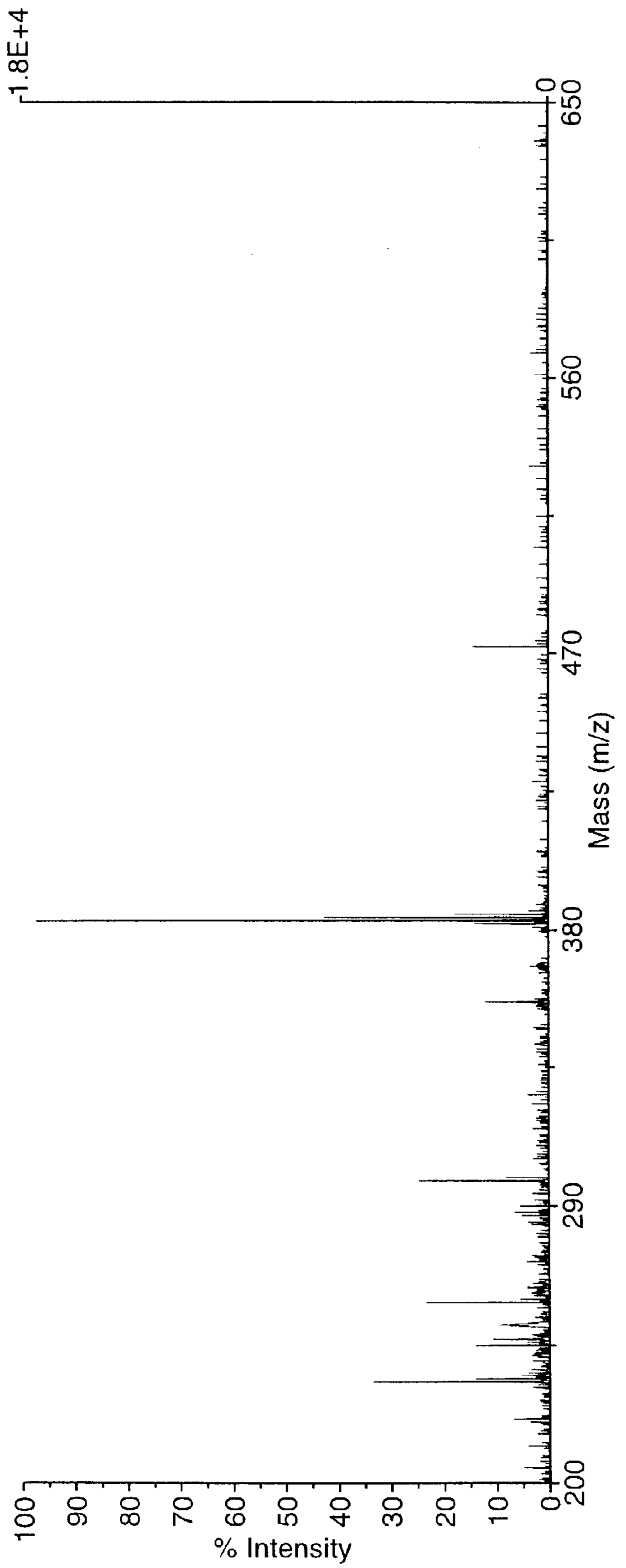
FIG. 2*b* is a mass spectrum of prazosin without matrix on graphite containing micro-porous high density polyethylene film plus a diamond like glass coating.
Figure 3A:
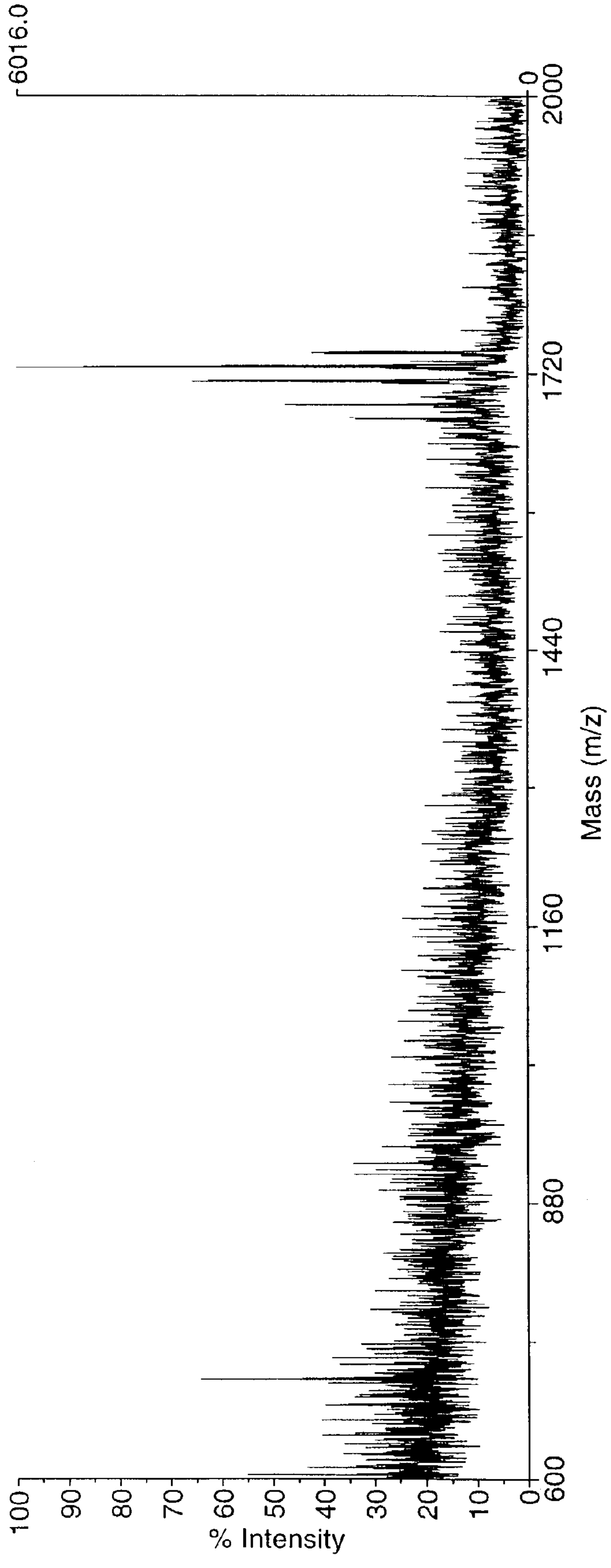
FIG. 3*a* is a mass spectrum of neurotensin without matrix on graphite containing micro-porous high density polyethylene film without a diamond like glass coating.
Figure 3B:
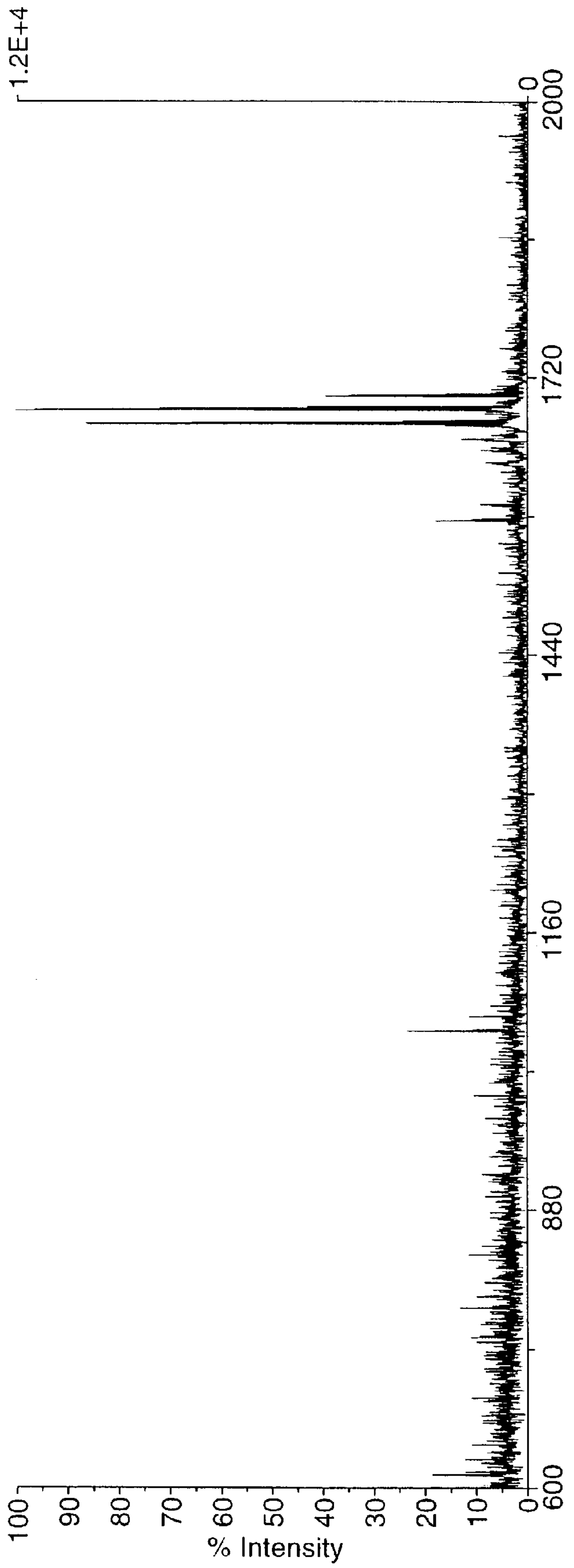
FIG. 3*b* is a mass spectrum of neurotensin without matrix on graphite containing micro-porous high density polyethylene film plus a diamond like glass coating.
Figure 4A:
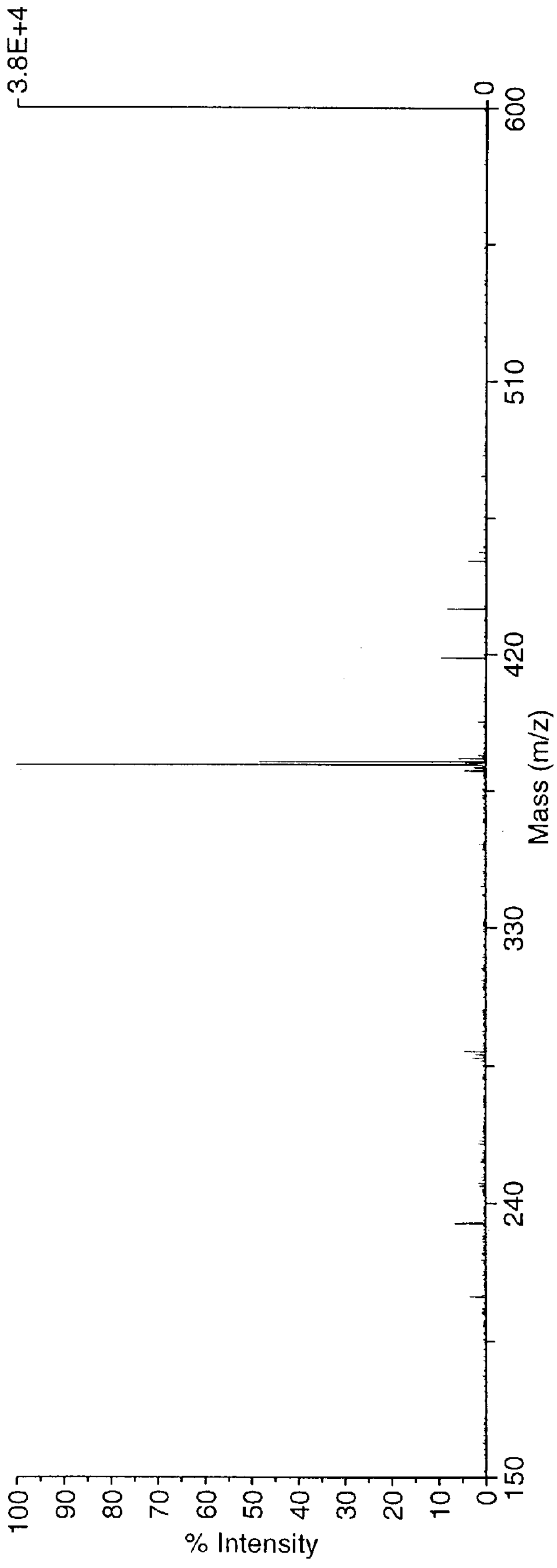
FIG. 4*a* is a mass spectrum of prazosin without matrix on micro-porous high density polyethylene film containing tungsten particles and without a diamond like glass coating.
Figure 4B:
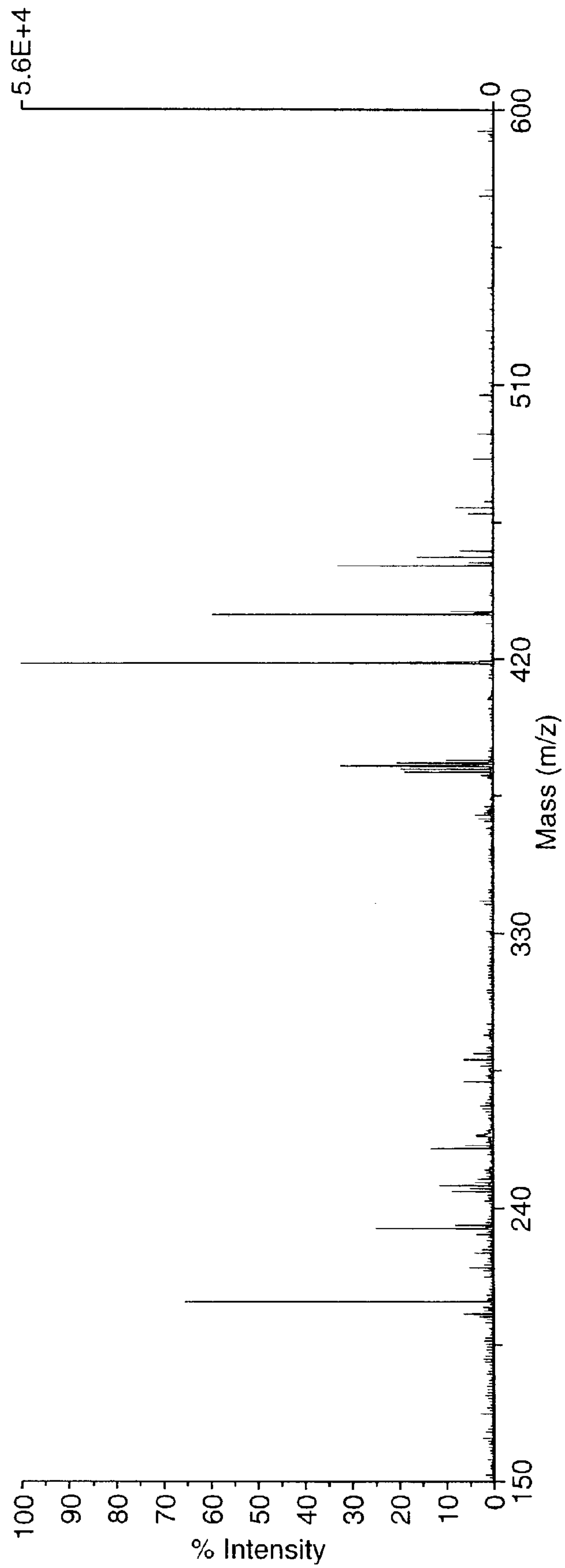
FIG. 4*b* is a mass spectrum of prazosin without matrix on micro-porous high density polyethylene film containing tungsten particles and a diamond like glass coating.
Figure 4C:
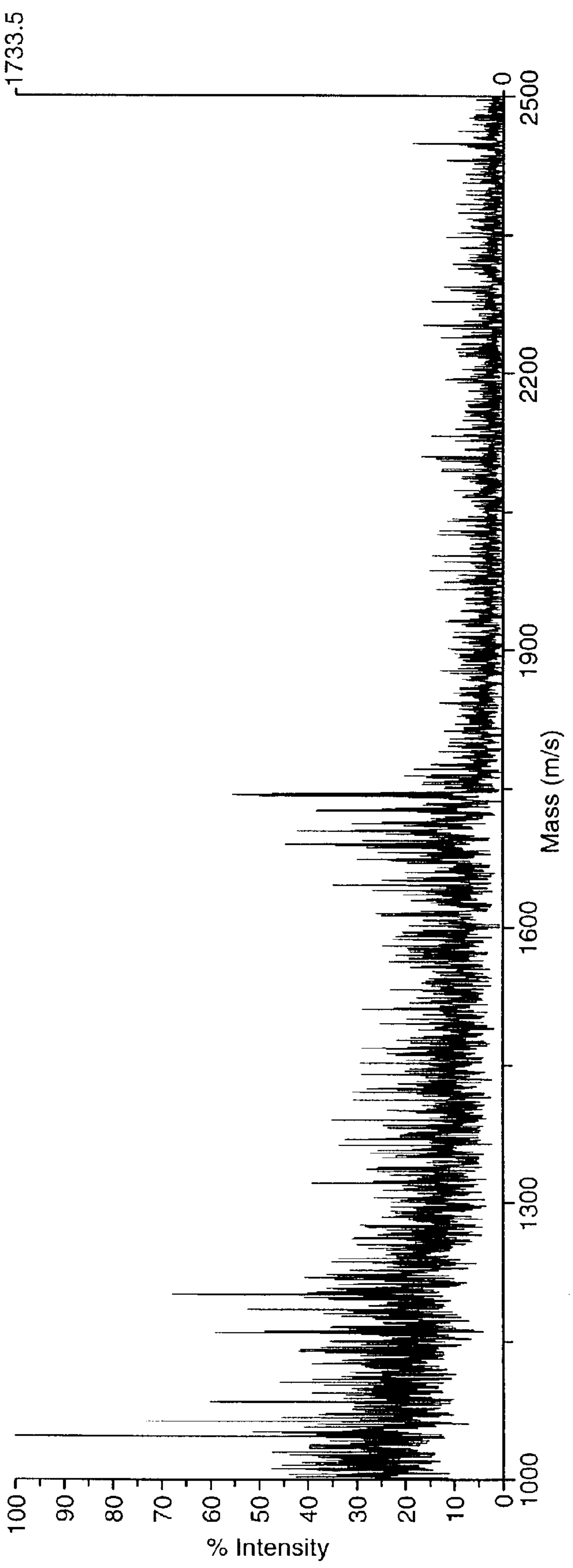
FIG. 4*c* is a mass spectrum of neurotensin without matrix on micro-porous high density polyethylene film containing tungsten particles and without a diamond like glass coating.
Figure 4D:
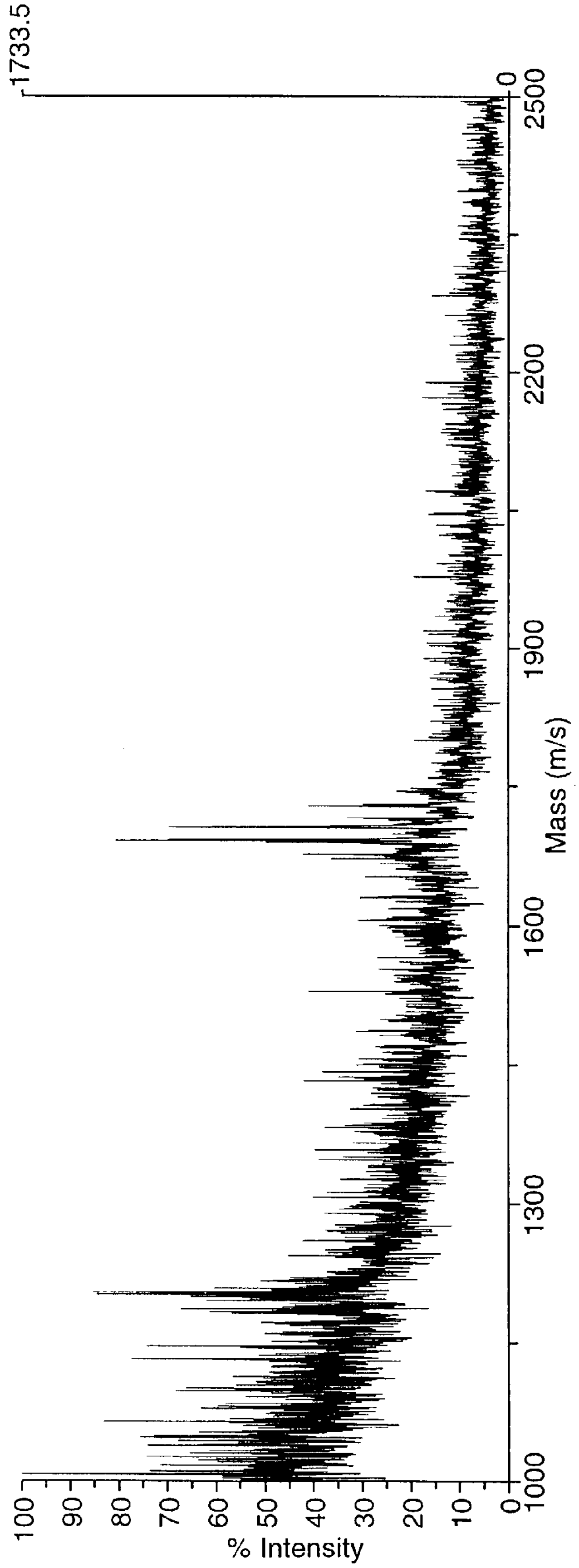
FIG. 4*d* is a mass spectrum of neurotensin without matrix on micro-porous high density polyethylene film containing tungsten particles and a diamond like glass coating.

Examples 5-8 demonstrate the use of particle-loaded porous films as LDI substrates. The films were prepared as in Examples 1-4 above except GM9255 high density polyethylene was used (Hoescht Celanese). Approximately 22% by weight of graphite (TimCal America Inc., Westlake, Ohio) was compounded into the film using a 30% dispersion of the graphite in mineral oil. The membrane was clamped between two metal frames and placed in a methyl ethyl ketone bath for 15 minutes to remove the mineral oil. DLG spots were applied using the same method as in Examples 1-4 above. Analytes were spotted onto the substrates as in Examples 1-4. Testing was done with and without DLG coatings. A matrix was not used. The test results using the graphite-loaded films are shown in Table 2 below. The LDI mass spectra for prazosin without DLG (E5) and with DLG (E7) are shown in FIGS. 2*a* and 2*b*. The LDI mass spectra for neurotensin without DLG (E6) and with DLG (E8) are shown in FIGS. 3*a* and 3*b*.

Examples 9-12

Examples 9-12 demonstrate the use of particle-loaded porous films as an LDI substrate. The films were prepared as in Examples 5-8 above except FINA 1285 high density polyethylene and non-conductive carbon (Columbian Chemicals, Marietta, Ga.) was compounded into the films. The membrane was clamped between two metal frames and placed in a methyl ethyl ketone bath for 15 minutes to remove the mineral oil. DLG spots were applied using the same method as in Examples 1-4 above. Analytes were spotted onto the substrates as in Examples 1-4. Testing was done with and without DLG coatings. A matrix was not used. The test results using the carbon-loaded films are shown in Table 2 below.

TABLE 2

| Molecule | (Examples) graphite MPF w/o matrix, w/o DLG | R | S/N | (Examples) graphite MPF w/o matrix + DLG | R | S/N | (Examples) carbon MPF w/o matrix, w/o DLG | R | S/N | (Examples) carbon MPF w/o matrix + DLG | R | S/N |
|---|---|---|---|---|---|---|---|---|---|---|---|---|
| Prazosin | 5: | 3520 | 3810 | 7: | 3240 | 18000 | 9: | 2100 | 950 | 11: | 1200 | 150 |
| Neurotensin | 6: | 3500 | 100 | 8: | 5000 | 200 | 10: | 5000 | 50 | 12: | 6100 | 100 |

Examples 13-16

Examples 13-16 demonstrate the use of metal particle-loaded porous films as an LDI substrate. The films were prepared as in Examples 5-8 above except 5-8% metal powder was compounded into the films. PbO (lead oxide, Hammond Lead Products, Hammond, Ind.) and W (tungsten, Union Carbide Corp, Danbury, Conn.) were used as the metal powders. The membrane was clamped between two metal frames and placed in a methyl ethyl ketone bath for 15 minutes to remove the mineral oil. DLG spots were applied using the same method as in Examples 1-4 above. Prazosin and neurotensin were used as the test analytes and were spotted onto the substrates as in Examples 1-4. Testing was done with and without a DLG coating. A matrix was not used for any of the tests. The test results using the metal particle-loaded films without matrix are shown in Table 3 below and the LDI mass spectra for prazosin and neurotensin without DLG (E13) and with DLG (E14) are shown in FIGS. 4*a*, 4*b*, 4*c* and 4*d*. For reference, the R and S/N ratio for prazosin are 4070 and 9330 on metal plate with matrix, whereas for neurotensin they are 10870 and 1800 respectively.

TABLE 3

| Sample | Substrate | Prazosin R | Prazosin S/N | Neurotensin R | Neurotensin S/N |
|---|---|---|---|---|---|
| 13 | MPF + W | 3154 | 98 | 7439 | 18 |
| 14 | MPF + W + DLG | 2678 | 136 | 2985 | 24 |
| 15 | MPF + PbO | 6181 | 23100 | Fragments* | |
| 16 | MPF + PbO + DLG | 3456 | 357 | Fragments* | |

*Lower molecular weight fragments of the ion peaks were detected

Examples 17-24

Figure 5A:
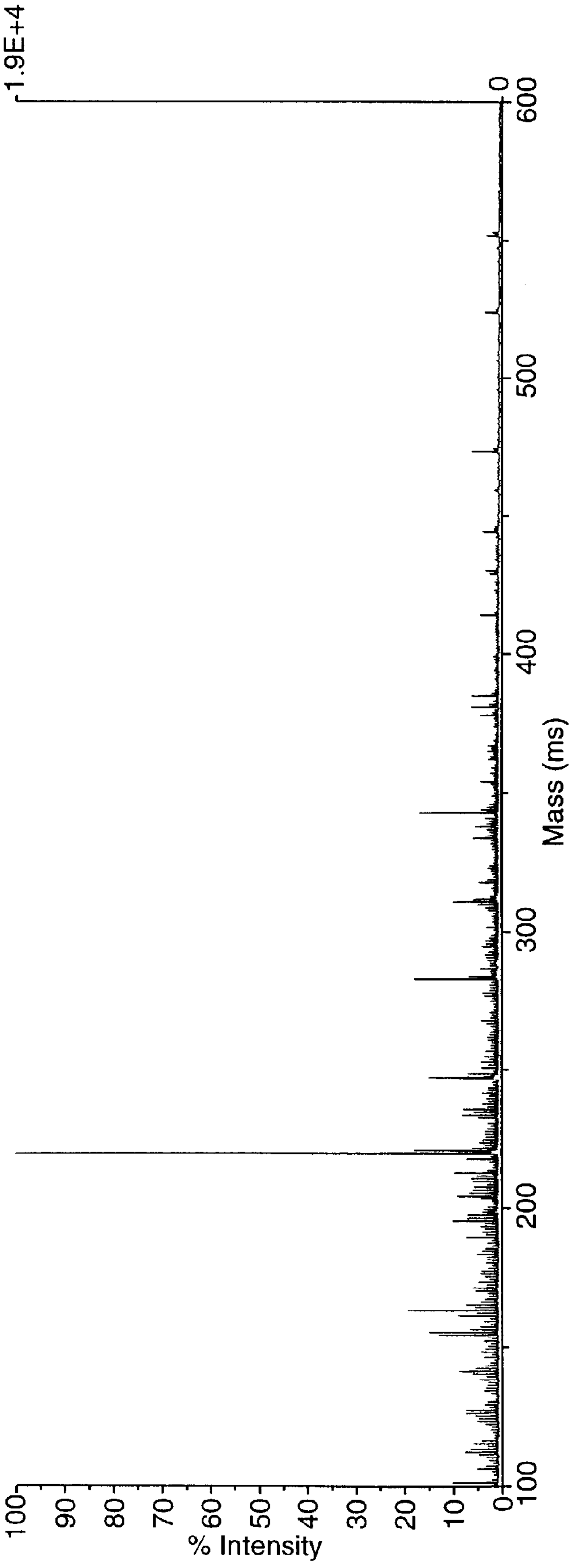
FIG. 5*a* is a mass spectrum of a combination of chemical samples on graphite micro-porous high density polyethylene film plus a diamond like glass coating (positive ionization mode).
Figure 5B:
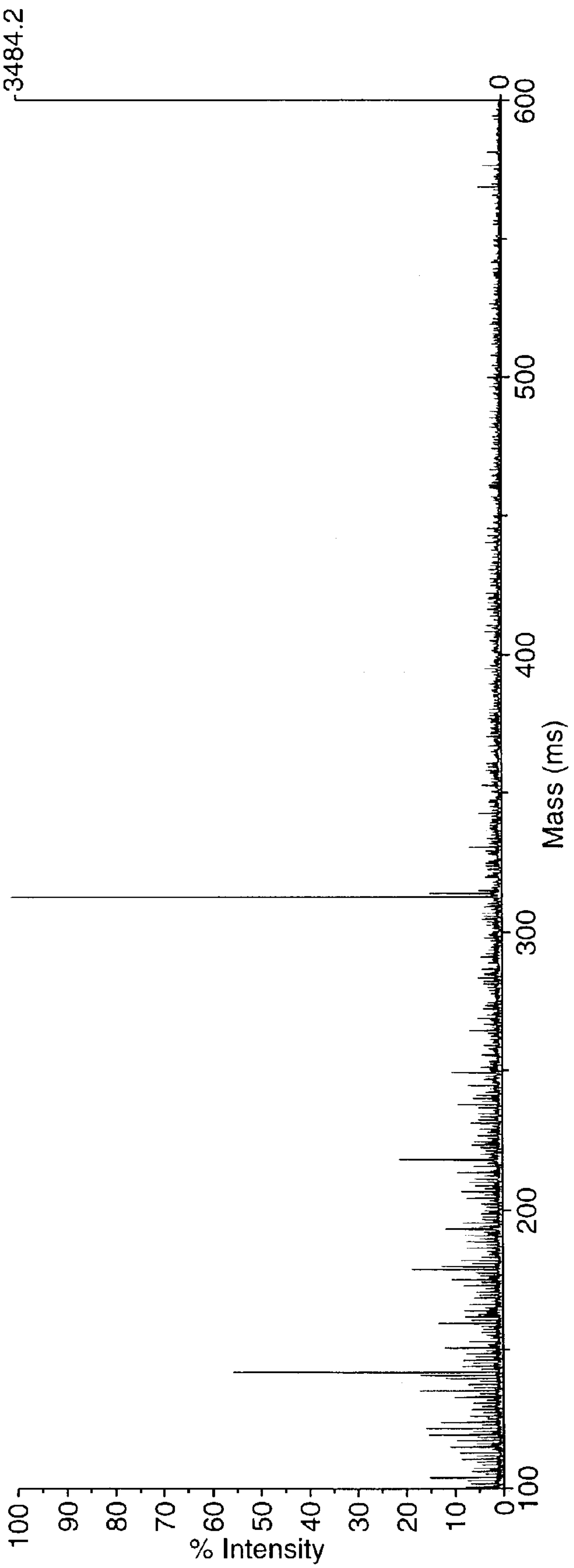
FIG. 5*b* is a mass spectrum of a combination of chemical samples on graphite micro-porous high density polyethylene film plus a diamond like glass coating (negative ionization mode).
Figure 6:
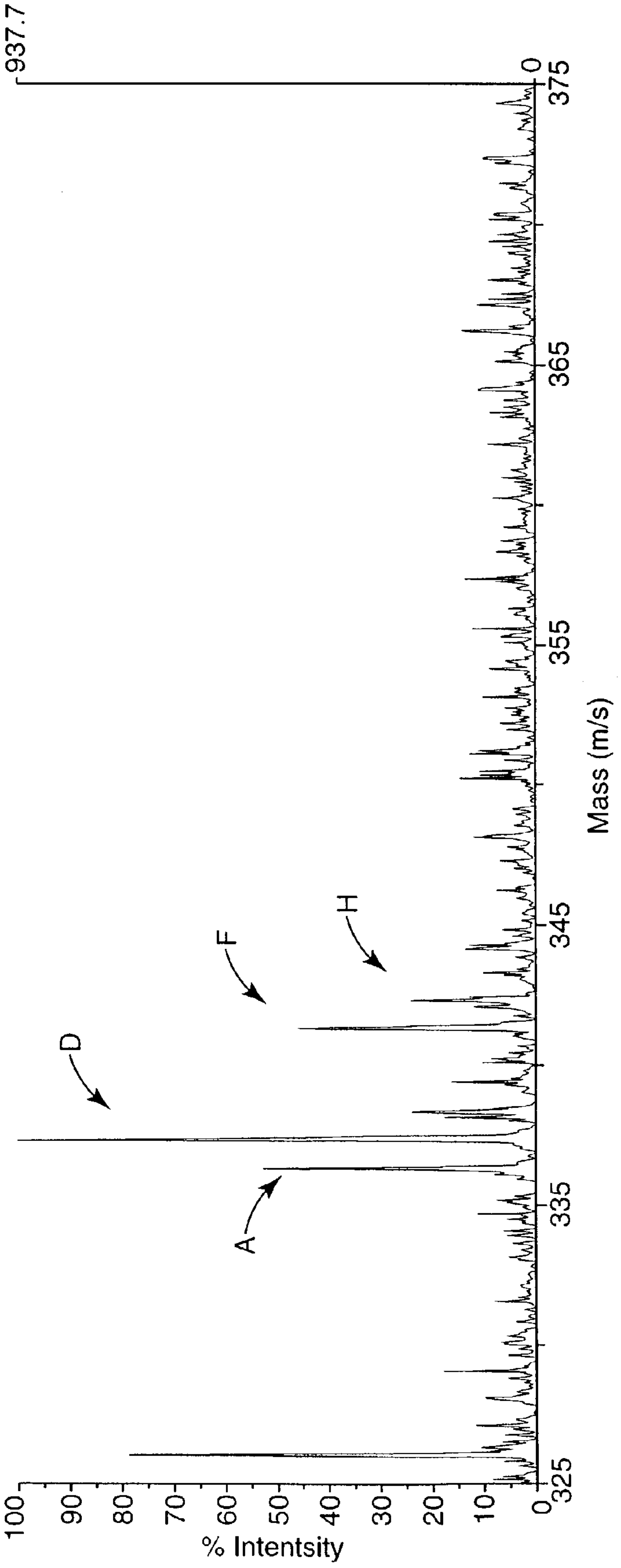
FIG. 6 is a mass spectrum of a mixture of compounds on graphite micro-porous high density polyethylene film plus diamond like glass coating.

The graphite-loaded MPF described in Examples 5-8 above was used with DLG spots to analyze a series of 8 synthesized drug molecules having molecular weights in close proximity to each other. The series of eight molecules were dissolved individually in methanol in concentration ranges from 0.1 to 0.3 μg/μL. Samples were labeled A through H. 1.0 μL of each solution was spotted onto the MPF and air-dried. A Voyager-DE™ STR BioSpectrometry Workstation, in reflectron mode, with positive and negative ionization, was used for the testing. The LDI mass spectra of compound F in both positive and negative ionization modes are shown in FIGS. 5*a* and 5*b* respectively, showing that this technique can be used to verify the molecular weight of low molecular weight molecules in the positive and negative ionization modes in the absence of matrix. The sensitivity and reproducibility of this technique were further confirmed by analyzing a mixture of four of the compounds at different concentrations. FIG. 6 shows one of the three replicates spectrum showing that the ion signals (positive ionization mode) of A (1.0 μL), D (1.0 μL), F (0.5 μL), and H (1.5 μL) were detected and consistent in three replicate runs despite the variation in concentration. The resolution and signal to noise ratio of the testing of the eight compounds are shown below in Table 4.

TABLE 4

| | | Molecular | Positive ionization | | Negative ionization | |
|---|---|---|---|---|---|---|
| Example | Molecule | Weight | R | S/N | R | S/N |
| 17 | A | 336 | 5800 | 140 | 6650 | 250 |
| 18 | B | 336 | 4550 | 120 | 5860 | 350 |
| 19 | C | 337 | 6620 | 140 | 4100 | 160 |
| 20 | D | 337 | 4560 | 240 | 3680 | 640 |
| 21 | E | 337 | Not observed* | | Not observed* | |
| 22 | F | 341 | 5740 | 1750 | 4410 | 610 |
| 23 | G | 341 | Not observed* | | 7810 | 160 |
| 24 | H | 342 | 6670 | 40 | 3960 | 350 |

*No ion peak was detected for the analyte

We claim:

1. A method of analyzing a sample material, the method comprising:

providing a porous polymeric substrate configured to receive the sample material;

desorption of an analyte from the substrate using a high energy beam; and analysis of the desorbed analyte using a mass spectrometer;

wherein the porous polymeric substrate contains a particle filler.

2. The method of analyzing a sample material of claim 1, wherein the particle filler comprises metal particles, metal oxide particles, carbon particles, or a combination thereof.

3. The method of analyzing a sample material of claim 1, wherein the porous polymeric substrate has a coating.

4. The method of analyzing a sample material of claim 3, wherein the coating comprises diamond-like glass.

5. The method of analyzing a sample material of claim 1, wherein the porous polymeric substrate is formed by thermally induced phase separation.

6. The method of analyzing a sample material of claim 1, wherein the high energy beam comprises a laser beam.

* * * * *